Aug. 30, 1966   E. R. REYNOLDS   3,269,101
GRASS CATCHER ATTACHMENT FOR ROTARY LAWN MOWER
Filed Nov. 5, 1964

INVENTOR.
EDWARD R. REYNOLDS
BY Schroeder, Siegfried
& Ryan
ATTORNEYS

United States Patent Office 3,269,101
Patented August 30, 1966

3,269,101
GRASS CATCHER ATTACHMENT FOR
ROTARY LAWN MOWER
Edward R. Reynolds, St. Paul, Minn., assignor of one-half to Miller Bag Co., Minneapolis, Minn., a corporation of Minnesota, and one-half to Joe Leader, doing business as Trojan Products Company, Minneapolis, Minn.
Filed Nov. 5, 1964, Ser. No. 409,154
3 Claims. (Cl. 56—202)

This invention relates to a device for use on rotary lawn mowers for supporting an air pervious bag upon such a lawn mower which has heretofore had no provision therefor.

It is a general object of my invention to provide a novel device for quickly, easily, and efficiently securing a bagging attachment to a rotary lawn mower which has previously had no provision made therefor.

A more specific object is to provide a novel, simple and inexpensive device for quickly, easily, and more satisfactorily securing a bagging attachment to a rotary lawn mower having no other means provided for that purpose.

Another object is to provide a device which is novel, simple, inexpensive and easily applied to a rotary lawn mower for quickly and effectively securing a bagging attachment to such a mower which has previously had no provision made therefor.

These and other objects and advantages of this invention will more fully appear from the following description, made in connection with the accompanying drawings, wherein like reference characters refer to the same or similar parts throughout the several views, and in which.

Figure 4:
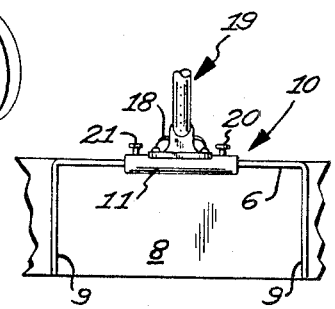
FIG. 4 is a fragmentary end elevational view of my device looking inwardly into the discharge portions of a rotary lawn mower when the same is attached thereto in grass catcher supporting position.

The embodiment shown in the drawing is shown attached to a rotary lawn mower M which includes a housing 5 having a top wall 6 and generally vertically extending side walls 7. One of these side walls defines a lateral discharge 8. The portions 9 of the housing 5 which define the lateral discharge 8 are generally inverted U-shape similar in construction to that shown in FIG. 7 of U.S. Letters Patent No. 2,932,146, for example. It will be noted that the discharge defining portions of the housing 5 include the horizontally extending portions indicated by the numeral 6 in FIG. 4 which is actually part of the top wall.

Figure 3:
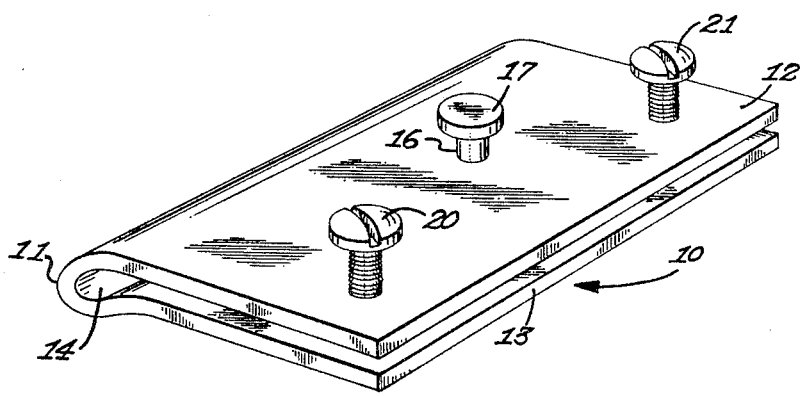
FIG. 3 is a perspective view of my grass catcher attachment for rotary type lawn mowers.

As best shown in FIG. 3, my device is comprised of a generally U-shaped metal plate member indicated generally by the numeral 10 and having a base or bight portion 11 which connects a pair of parallel extending closely spaced leg portions 12 and 13. These leg portions 12 and 13 are more closely spaced than the usual thickness of the top wall 6 of the housing of such a rotary lawn mower so that they will tend to firmly engage the upper and lower surfaces thereof when the device has been slid onto the horizontal portions 6 of the discharge defining portions of the housing.

Figure 2:
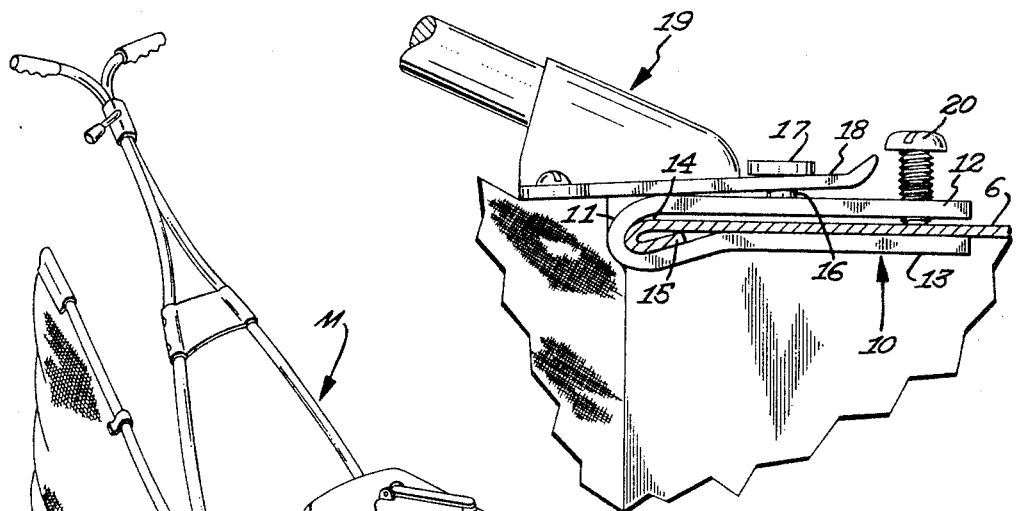
FIG. 2 is a fragmentary vertical sectional view on an enlarged scale taken along line 2—2 of FIG. 1.
Figure 1:
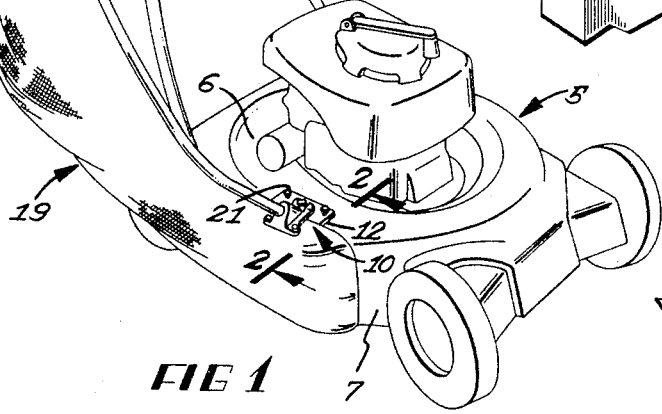
FIG. 1 is a perspective view of one embodiment of my invention attached to a lawn mower housing and securing a bagging attachment thereto by means thereof.

The bight portion 11 of the metal plate member 10 is characterized by an inner channel 14 which has dimensions greater than the spacing between the leg portions 12 and 13. As best shown in FIG. 2, the channel 14 readily receives a downwardly and inwardly turned lip member 15 of the horizontal portions of the housing 5 which define the discharge member 8. It will be noted that the outer peripheral portions of the top wall 6 have been turned inwardly and downwardly to form the lip structure 15. The dimensions of the groove 14 are at least equal to the dimensions of the lip structure 15.

Mounted upon the upper leg portion 12 in centrally disposed position is an upstanding post 16 which has a radially outwardly extending flange or head member 17 at its upper end. This head member is vertically spaced from the upper surface of the leg portion 12 and is of sufficient diameter so as to exceed the width of the slot within a slotted member 18 of a bagging attachment for rotary lawn mowers such as is disclosed and claimed in U.S. Patent No. 3,047,998. The construction of the bagging attachment indicated generally by the numeral 19 is identical to that shown in U.S. Patent No. 3,047,998 and additional reference may be made to said patent for further information with respect to its construction and operation.

The top leg portion 12 is also provided with a pair of threaded bolts or set-screws 20 and 21 adjacent opposite end edges thereof in order to adapt the same for being fixedly secured to the horizontal portion 6 of the rotary lawn mower housing. When it is desired to connect such a grass catching attachment, as is shown in U.S. Patent No. 3,047,998, to a conventional lawn mower which has no provision for such an attachment, it is a simple matter to merely slide the device 10 onto the horizontal portions of the discharge defining areas of the housing 5 until the lip structure fits within the groove 14. If there is no lip structure on the housing 5, then of course, the device 10 is slid onto the housing far enough until the peripheral portions of the housing engage the bottom of the groove 14. Thereafter the bolts or set-screws 20 and 21 are tightened to fixedly clamp the device 10 in the proper position. In this connection, it should be noted that it is a simple matter to accurately position the post 16 by adjustment of the securing means 20 and 21 so that the grass catching attachment 19 will properly register with the discharge 8 of the housing 5. This has a very distinct advantage over attempting to modify such a housing 5 by drilling a hole into the housing and mounting a connecting member thereon such as is shown in U.S. Patent No. 3,047,998 for the simple reason that it is extremely difficult to accurately locate such a post so as to insure that the bagging attachment will properly register with the discharge opening 8. Moreover, my device makes it a simple and easy task to quickly modify the conventional rotary lawn mower which has no inherent provision for connecting such a grass catching attachment thereto. In addition, as pointed out above, with this device one can be assured that the most desirable location of the post 16 can be obtained.

Once the plate member 10 has been properly secured to the discharge defining portions of the housing 5, it is a simple matter to attach or detach the grass catching attachment such as is shown in U.S. Patent No. 3, 047,998 thereto and all of the advantages thereof can be obtained in conjunction with the conventional lawn mower housing which has no inherent provisions for supporting such a grass catching attachment.

It will, of course, be understood that various changes may be made in the form, details, arrangement and proportions of the parts without departing from the scope of this invention which consists of the matter shown and described herein and set forth in the appended claims.

What is claimed is:

1. In a grass catching attachment for a rotary-type lawn mower comprising:
   (a) a lawn mower housing having generally horizontally extending peripheral portions defining a discharge member, (b) said horizontally extending peripheral portions terminating in a lip structure having a thickness substantially in excess of the remainder of said portions, (c) a generally flat U-shaped plate member having in cross-section a pair of closely spaced leg portions which are greater in width than in length and are adapted to receive said horizontally extending peripheral portion of said housing therebetween in close fitting relation, (d) said plate member having a bight portion connecting said leg portions and forming an inner channel therein between said leg portions, said channel having transverse dimensions substantially in excess of the spacing between said leg portions and substantially equal to the transverse dimensions of said lip structure of said peripheral portions of said housing, (e) adjustable securing means carried by said leg portions of said plate member for fixedly securing said plate member to said peripheral portions of said housing, (f) said plate member being shiftable laterally relative to said peripheral portions of said housing by adjustment of said securing means, (g) a grass catching bag supporting member adapted to engage said generally U-shaped plate member to support the bag in grass receiving relation with said discharge member, (h) releasable means carried by said leg portions for engagement by said bag supporting member securing the bag supporting member to said plate member on said housing discharge member, in grass receiving relation.

2. The invention according to claim 1, wherein the said releasable means carried by said leg portions comprises an upstanding headed post.

3. The invention according to claim 1, wherein said adjustable securing means carried by said generally U-shaped plate member comprises at least one set screw in one leg portion for engagement with said housing.

References Cited by the Examiner

UNITED STATES PATENTS

| | | | |
|---|---|---|---|
| 1,834,682 | 12/1931 | Colstad | 248—226.1 XR |
| 1,867,276 | 7/1932 | McIntyre | 248—226.1 |
| 2,532,848 | 12/1950 | Kravitz | 248—226.1 XR |
| 2,591,337 | 4/1952 | Cohen et al. | 248—226.1 |
| 2,632,241 | 3/1953 | Haislip | 248—266 XR |
| 2,914,829 | 12/1959 | Willemain | 56—194 |
| 3,047,998 | 8/1962 | Leader et al. | 56—202 |
| 3,165,877 | 1/1965 | Leader et al. | 56—202 |

ANTONIO F. GUIDA, *Primary Examiner.*

A. G. STONE, *Examiner.*

J. O. BOLT, *Assistant Examiner.*